United States Patent Office 3,316,188
Patented Apr. 25, 1967

3,316,188
DIELECTRIC LENS MATERIAL COMPRISING A HALOGENATED EPOXY RESIN COMPOSITION AND A POLYMERIZED VEGETABLE OIL DERIVED POLYAMIDE RESIN
Sven U. K. A. Richter, Springfield, and Herbert S. Schnitzer, Longmeadow, Mass., assignors to De Bell & Richardson, Inc., Hazardville, Conn., a corporation of Connecticut
No Drawing. Continuation of application Ser. No. 852,927, Nov. 16, 1959, now Patent No. 3,198,756, dated Aug. 3, 1965. This application Mar. 10, 1965, Ser. No. 438,759
2 Claims. (Cl. 260—2.5)

This application is a continuation of copending application Ser. No. 852,927, filed Nov. 16, 1959 now U.S. Patent No. 3,198,756, and relates to a flame resistant self-extinguishing dielectric resin foam and a method for making such foam.

More particularly it relates to flame resistant, self-extinguishing foams formed principally from resin compounds having two or more epoxide groups

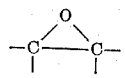

per molecule, or

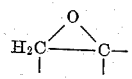

when in terminal form, to which precisely controlled isotropic dielectric properties have been imparted by the dispersal therein of finely divided aluminum, or other metal found reactive during combustion with halogen containing epoxide resins, and which have a physical strength, isotropic rigidity and structural uniformity, such that the foam may be manufactured in large prefoamed blocks or blanks from which may be machined light-weight lenses for radar navigational, microwave refractive and other electronic devices, in which lightness, strength, rigidity and dimensional stability are important.

The advantages and characteristics of such controlled, light-weight, isotropic, dielectric foams are disclosed in copending application, Ser. No. 642,339, filed Feb. 26, 1957 now abandoned.

In many uses it has been found importantly desirable and in some cases essential that such dielectric foam structures be self-extinguishing.

It is the broad objective of the present invention to provide a polyepoxide foam of the above character, produced in large prefoamed blocks or blanks which are physically and dielectrically isotropic, having controlled predetermined dielectric values, and which are flame resistant and self-extinguishing. A further object is to provide such a product which possesses increased assurance of its dielectric isotropy, and a method by which the above objectives may be achieved.

It is known that many conventional plastics foams may be rendered self-extinguishing by adding, as fillers, certain metallic oxides, such as antimony oxide, or halogenated organic compounds such as chlorinated biphenyl, or combinations of such materials.

In the application of such expedients to the present problem, the additives which are responsible for any resulting self-extinguishing characteristics are present only as inert filler material, as far as the resin is concerned, and do not enter into the cure of the resin. As a result, for a given desired dielectric constant, it is necessary to replace resin with such inert fillers if the density is not to be increased, thus weakening the foam structure physically, or, if physical strength cannot be reduced, it is necessary to add flameproofing fillers to the system, thus increasing density. In any case, particularly for certain aircraft guidance applications, where both light-weight and high strength are necessary, such a solution to the flammability problem proved unsatisfactory. The use of otherwise inert flameproofing fillers reduced the amount of powdered metal filler which could be used in the composition, thus limiting the maximum dielectric constant which could be achieved at a given density.

The uniformity of the dielectric constant from point to point within the foam structure is very important, and depends on achieving a random distribution of high-dielectric filler material such as, for example, aluminum powder, in an isotropic foam structure. The fabrication of an isotropic unfilled epoxy foam structure can be achieved, by using a process such as is described in copending application Ser. No. 821,346, filed June 19, 1959 now U.S. Patent No. 3,223,654. A good distribution of powder filler can be made by dispersing the filler in the resin with the aid of a wetting agent, but it has been our experience that the amount of filler which can be dispersed in a random distribution in this manner is limited, and depends to an undesirable extent on the type of resin being used.

As above indicated an object of the present invention is to provide a light-weight epoxy resin foam of controlled dielectric values, having self-extinguishing properties, and containing a minimum quantity of non-resinous filler material in the achievement of the desired dielectric value.

It is a further object of this invention to provide a means for obtaining improved dielectric isotropy in a filled light-weight epoxy resin foam.

It is known that the presence of halogen atoms in cured epoxy resin molecules will impart self-extinguishing characteristics to epoxy resins. For example, chlorendic anhydride is a curing agent for epoxy resins which also contains chlorine atoms in its molecular structure, so that epoxy resin systems can be made self-extinguishing by curing with this material. Obviously, the design and choice of such a cure system is limited to, at most, a few halogenated anhydride curing agents which are available, so that versatility and utility are restricted.

Another means of obtaining halogen atoms in cured epoxy resin molecules is to put them on the resin chains during the manufacture of the resin. For example, the substitution of a tetra bromobisphenol A, such as, 2,2'-bis(3,5-dibromo, 4-hydroxyphenyl) propane or tetra chlorobisphenol A, such as, 2,2'-bis(3,5-dichloro, 4-hydroxyphenyl) propane for the traditional bisphenol A, such as, 2,2'-bis-4-hydroxyphenyl propane, in the reaction with epichlorohydrin is one way to form a halogenated epoxy resin. Minor proportions of such resins, when blended with conventional non-halogenated resins, and cured with well-known curing agents, are sufficient to impart adequate self-extinguishing properties, leaving a wide choice of curing agents and curing procedures available to the discretion of a formulator.

The incorporation of halogenated epoxy resins in conventional epoxy resins and curing agents has also been proposed for the preparation of self-extinguishing unfilled epoxy resin foams. Unexpectedly, we found that when aluminum powder was used as a filler in such foams, the resulting foams were not self-extinguishing, and, in fact, burned more vigorously than similar foams containing no halogen.

We further found, however, that when a small amount of antimony oxide was incorporated in aluminum-filled epoxy resin foam systems containing bound halogen, excellent self-extinguishing properties were obtained. We have thus been able to achieve the combination of high strength and low density in a self-extinguishing controlled dielectric epoxy resin foam.

In making a controlled dielectric foam of the type disclosed in said copending application Ser. No. 642,339, now abandoned random distribution of aluminum powder is satisfactorily achieved by using a dispersing agent such as Diglycol Laurate S and adjusting the foaming condition of temperature and viscosity. When we applied the same conditions to a system containing some brominated epoxy resin and antimony trioxide, we found that we were unable to achieve dielectric isotropy consistently, although in terms of density distribution and physical strength, the flameproofed foam was substantially equivalent to the non-flameproof foam. The presence of brominated resin and antimony trioxide apparently causes a change in the surface tension characteristics of the system which seems to result in orientation of the aluminum filler particles during foaming. We found that this can be prevented by adding to the mixture before foaming a quantity of polymerized vegetable oil derived polyamide resin, such as Versamid 115. Such resinous materials react with and cure epoxy resins, so that it is desirable to adjust the quantities of curing agents, normally used, to compensate for this.

This curing effect of such ployamide resins is known, however the effect of these materials in preventing orientation of the dielectric filler materials is wholly new and unexpected.

The following example illustrates the nature and advantages of the invention, having reference to the foaming procedure disclosed in our copending application Ser. No. 848,459, filed Oct. 23, 1959, now abandoned, the polyepoxide resin being that commercially available under the trade name "Epon." These Epon resins have the structural formula

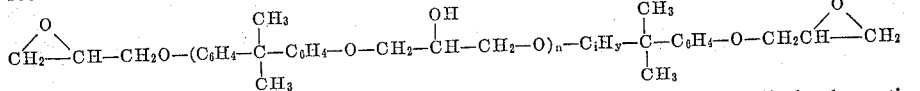 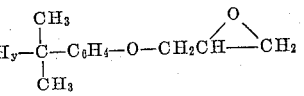

The resins having this general formula are chemically designated in the art as the glycidyl polyether condensation products of epichlorohydrin and bisphenol A, and depending on the proportions of these reactants used, vary from liquids of various viscosities to solids of various melting points. The viscosity or melting point of a specific reaction product is indicated by its epoxide equivalent weight. For example, Epon 828 and Epon 834 have epoxide equivalent weights of 185–205 and 225–290 respectively.

*Example*

A rigid foam block in an octagonal shape measuring 24 inches across the flats and 8 inches thick was prepared from the following ingredients:

| | Grams |
|---|---|
| Epon 828 | 3020 |
| Epon 834 | 11300 |
| Brominated epoxy resin | 1593 |
| Aluminum powder 30XD | 1760 |
| Antimony oxide | 960 |
| Diglycol laurate S first addition | 480 |
| p,p'-Methylene dianiline | 2140 |
| Ammonium bicarbonate | 230 |
| Diglycol laurate S second addition | 400 |
| Versamid 115 | 798 |
| Diethylene triamine | 75 |

The brominated epoxy resin was prepared from tetrabromobisphenol A and epichlorohydrin by well-known techniques, and the reaction material balance indicated the two reactants had combined in an average molecular proportion of between 1 to 2 and 2 to 3, respectively.

To insure good dispersion of the antimony oxide in the finished structure, it was found desirable to make a pre-mix of a paste consisting of the antimony oxide, a portion of the Epon 828, and a portion of the first addition of Diglycol Laurate S, and pass this mixture through a colloid mill or similar device.

Epon 828, Epon 834, brominated epoxy resin, antimony oxide, and the first addition of Diglycol Laurate S were charged to a mixer and heated to about 75° C. to make a homogeneous mix. The other ingredients, with the exception of the vegetable oil derived polyamide resin, were charged to the mixer in accordance with the procedure described in our said copending application Ser. No. 848,459, now abandoned. The polyamide resin is preferably added shortly before the diethylene triamine, but may be added with the methylene dianiline or the diethylene triamine or at any time between.

The block was poured, foamed and cured as described in said application Ser. No. 848,459, now abandoned. The resulting dielectric foam material had an average density of 20.1 pounds per cubic foot and an average dielectric constant, at a frequency of 8500 megacycles per second, of 2.585. The dielectric constant measurements were made in different viewing directions on samples taken from various places within the block and showed remarkable uniformity. Twelve measurements varied from 2.546 to 2.618 and the average deviation was only 0.019. When specimens from this block of foam were tested for flammability in accordance with ASTM Method D 635–56T, they were found to be self-extinguishing.

In the example given the bromine content of the finished product is substantially 3½% by weight. To secure acceptable self-extinguishing properties the halogen content of the finished product may be as low as 1% by weight, based on the total weight, for low dielectric filler loadings, but beyond 20% no advantageous increase in self-extinguishing properties are normally obtained. Similarly the antimony oxide may be as low as 1% by weight based on the total weight of the foam and in general may equal in weight that of the bromine.

The amount of aluminum powder used will vary with the desired dielectric constant of the product in relation to the density of the foam and the dielectric constant of the resin used. The polyepoxide resins of the character indicated will accept aluminum powder as a filler up to 30 parts by weight per 100 parts of the finished foam. Higher amounts may be used to the extent that they can be uniformly dispersed in the mix, but above the 30 parts proper dispersal is difficult. While finely divided aluminum powder is preferred, the self-extinguishing combinations and other features of the invention are equally applicable to other metals found reactive during combustion with halogen containing epoxide resins.

In the above example the bromine content is introduced in the form of brominated epoxy resin, usually made from tetrabromobisphenol A and epichlorohydrin, and this is preferred. However, halogen can be introduced by reaction of non-halogenated epoxy resins with halogenated bisphenols such as for example tetrabromobisphenol A, or tetrachlorobisphenol A, or halogenated phenols such as pentabromophenol or pentachlorophenol. Also halogen may be introduced by means of nuclearly halogenated aromatic amines or polyamines, such as 2,4,6-tribromoaniline, alkylidene-bis-(dibromoaniline) or alkylidene-bis-(dichloroaniline). Halogen can, of course, be introduced to obtain the desired effect by any of these methods or a combination thereof.

The polymerized vegetable oil derived polyamide resins suitable for the purposes of this invention are those such as marketed under trademark Versamid 115.

The amount of vegetable oil derived polyamide resin used in carrying out this invention may be as low as 1% but beyond 20% no material additional advantage is apparent.

Having thus disclosed this invention, what is claimed is:

1. A foamed dielectric lens material comprising the thermoset foam product of the reaction of an epoxy resin curing agent with an epoxy resin compound having at least two epoxide groups

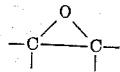

per molecule and containing halogen atoms attached to the resin molecules in an amount not less than 1% or more than 20% by weight based on the total weight of the foam, a decomposable blowing agent, a polymerized vegetable oil derived polyamide resin, the foam containing antimony oxide in an amount not less than 1% and not essentially greater, by weight, than the weight percentage of halogen present in the resin.

2. A foamed dielectric lens material comprising the thermoset foam product of the reaction of an epoxy resin curing agent, a vegetable oil derived polyamide resin and an epoxy resin compound having at least two epoxide groups

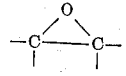

per molecule, said epoxy resin including a halogenated epoxy resin containing halogen atoms attached to the resin molecule, said foam containing antimony oxide and a metallic powder.

No references cited.

MURRAY TILLMAN, *Primary Examiner.*

J. C. BLEUTGE, *Assistant Examiner.*